March 24, 1964  M. A. RUBINSTEIN ETAL  3,125,851
FLOW CONTROL DEVICE

Filed April 16, 1962  3 Sheets-Sheet 1

INVENTORS
MARTIN A. RUBINSTEIN
KENNETH E. WERNER
BY
ATTORNEYS

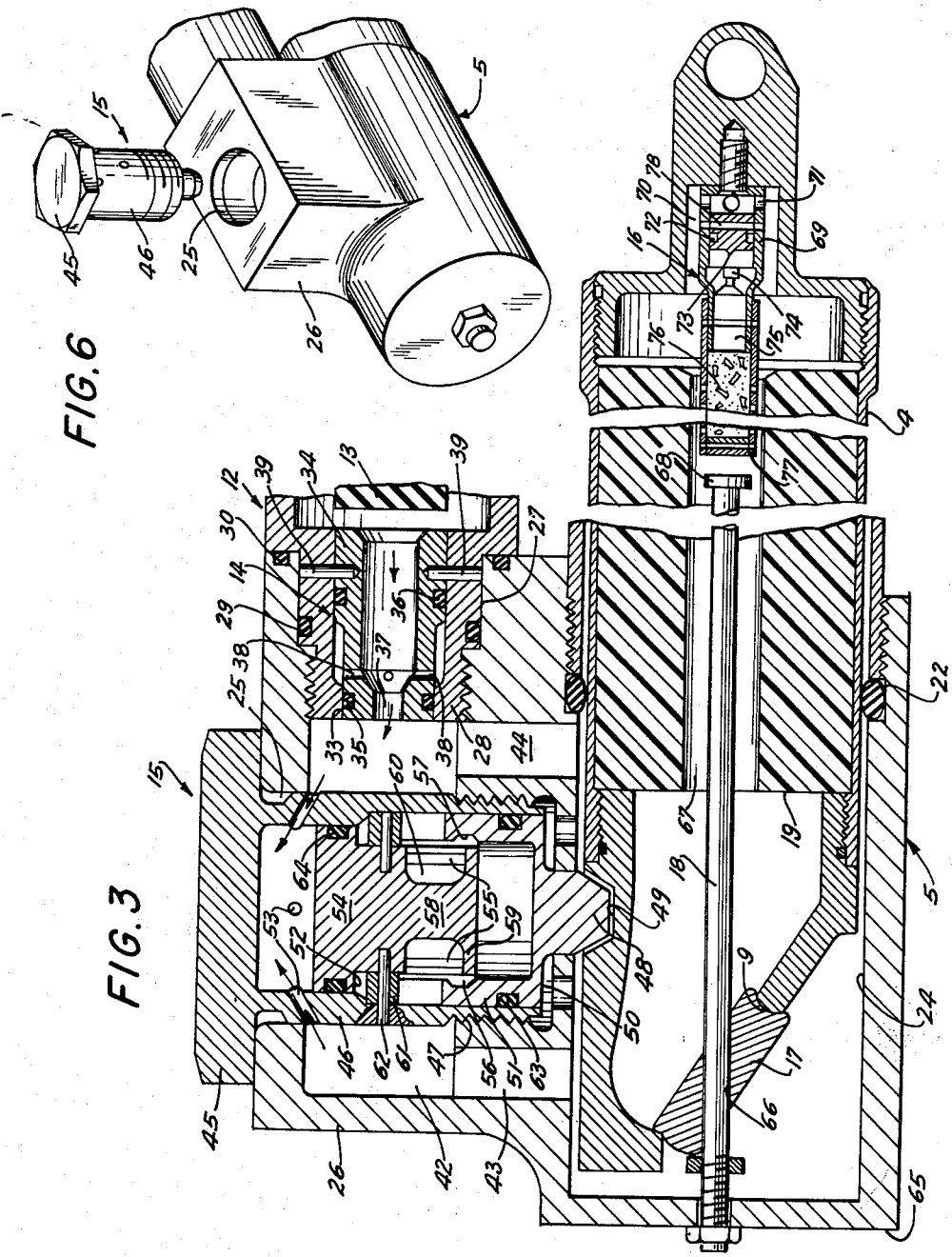

March 24, 1964    M. A. RUBINSTEIN ETAL    3,125,851
FLOW CONTROL DEVICE
Filed April 16, 1962    3 Sheets-Sheet 3

INVENTORS
MARTIN A. RUBINSTEIN
KENNETH E. WERNER
BY
Curtis, Morris & Safford
ATTORNEYS

United States Patent Office 3,125,851
Patented Mar. 24, 1964

3,125,851
FLOW CONTROL DEVICE
Martin A. Rubinstein, Morrisville, and Kenneth E. Werner, Langhorne, Pa., assignors to Thiokol Chemical Corporation, Bristol, Pa., a corporation of Delaware
Filed Apr. 16, 1962, Ser. No. 187,880
6 Claims. (Cl. 60—26.1)

The present invention relates to dynamic fluid flow control and, more particularly, to a controller operable in steps to maintain the pressure in a gas generator within predetermined limits.

The controller of the present invention is especially useful in minimizing pressure variations in gas generators utilizing a gas producing material of the solid propellant type. Gas generators using a solid propellant as a gas producing material are used successfully in many applications including, for example, a fluid source for catapults used to launch rocket engines. Such catapult-launched rocket-engine systems may be utilized in high-speed aircraft for the safe ejection of personnel in escape capsules when necessary. Systems of this nature may comprise a rocket-powered escape capsule, a fluid operated catapult for initially launching the rocket and a gas generator using a solid propellant as the gas producing material. In addition, some systems employ a fixed sonic flow orifice inserted in a conduit interconnecting the gas generator and catapult. The orifice provides a high-low pressure system wherein the gas generator operates at a pressure above that of the catapult by at least a critical ratio of approximately two to one. Flow through the orifice is therefore sonic and the generator pressure is maintained at a level sufficiently high to sustain burning of the propellant material independent of the catapult operating pressure.

In such applications, rocket catapult systems must function reliably at ambient temperatures ranging between —65° F. and 200° F. While the burning rates and pressures of many solid propellants are reproducible at a given temperature, mass flow variations at the high and low temperature, and therefore the burning rates, are in many instances unacceptable for over-all system operation. This is a known phenomenon caused by variations in the burning rate which vary approximately linearly with temperature and exponentially with generator pressure. Thus, an increase in either pressure or temperature will increase the rate of burning and the rate of generation of gases and, furthermore, a pressure buildup in the gas generator accompanies an increase in environmental temperatures. It can be seen, therefore, that these factors have a substantial affect on mass flow rates. In addition, the design of the catapult necessitates a compromise which, combined with the effect on mass flow rate, is apt to produce a variable performance in such systems.

One of the objects of the present invention is to provide a fluid flow control device which reduces variation in the generation of gas in a gas generator.

Another object is to provide a fluid flow control device which is operable responsive to a predetermined pressure in the gas generator to reduce the pressure and rate of gas generation to maintain a more uniform pressure pattern.

Another object is to provide a fluid flow control device for a catapult-launched rocket-engine which is operable in steps to maintain a maximum pressure and burning rate in a gas generator until a predetermined pressure is reached and then partially reducing the pressure and burning rate when the predetermined pressure is exceeded.

Still another object is to provide a flow control device for a gas generator of the type indicated which is of relatively simple and compact construction, economical to manufacture and one which is reliable in operation.

These and other objects will become more apparent from the following description and drawings, in which like reference characters denote like parts throughout the several views. It is to be expressly understood, however, that the drawings are for the purpose of illustration only and are not a definition of the limits of the invention, reference being had for this purpose to the appended claims.

In the drawings:

FIGURE 1 is a side elevational view of a portion of an aircraft partially broken away to show the catapult, to which the invention is applied, attached to the back of the pilot's seat;

FIGURE 2–A is a perspective view of the rear of the pilot's seat showing the normal position of the parts of the catapult;

FIGURE 2–B is a figure similar to FIGURE 2–A, showing the relationship of the rocket engine to its catapult after initial operation;

FIGURE 2–C is a view similar to FIGURE 2–A, showing the nozzle closure being stripped from the rocket engine during movement of the engine relative to the catapult casing;

FIGURE 2–D is a view similar to FIGURE 2–A, showing the catapult casing with the rocket engine leaving;

FIGURE 3 is an enlarged longitudinal section through the rearward and forward ends of the catapult casing and rocket engine, respectively, and showing the manner of mounting the control device of the present invention in the catapult casing to control the flow of propelling gas from the gas generator;

FIGURE 6 is a perspective view of the rearward end of the catapult casing and showing the manner in which the gas generator is mounted on the casing.

Figure 1:
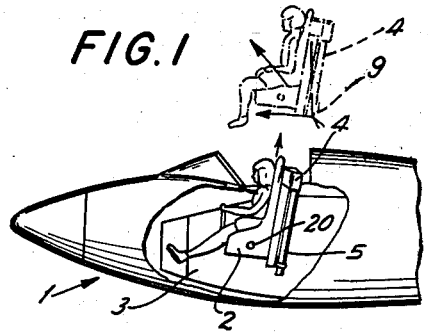
Figure 2A:
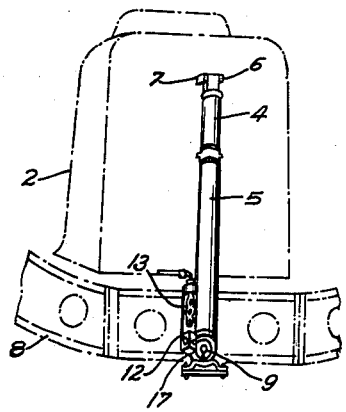
Figure 2B:
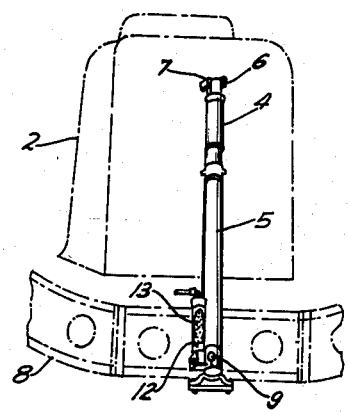
Figure 2C:
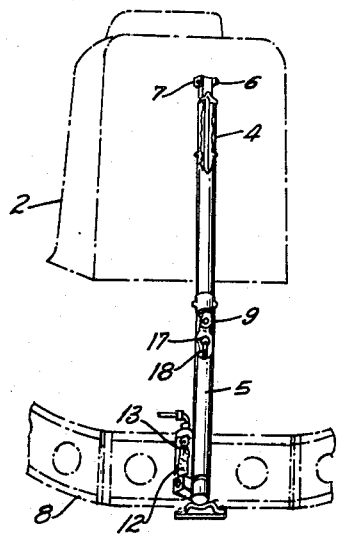
Figure 2D:
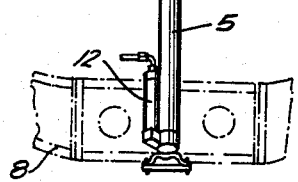

Referring first to FIGURES 1 and 2 of the drawings, the present invention is shown applied to an aircraft 1 for ejecting a pilot's seat 2 from the cockpit 3. It will be understood, however, that the present invention may be used in catapult systems to eject other objects from aircraft, such as cargo containers, canopies, hatches, or the like, or for other purposes. In the illustrated embodiment the pilot's seat 2 is ejected by a rocket engine 4 attached to the back of the seat. Rocket engine 4 is illustrated in the form of a tube mounted in a catapult casing 5 with its upper end projecting therefrom and connected to a suitable bracket 6 on the back of the pilot's seat by means of a pin 7. Catapult casing 5, on the other hand, is rigidly connected to the frame 8 of the aircraft, as clearly shown in FIGURES 2–A to 2–D. Rocket engine 4 and catapult casing 5 extend downwardly and forwardly along and parallel to the back of the pilot's seat 2, and the nozzle 9 of the rocket engine is directed downwardly and rearwardly, see FIGURES 1 and 2, to produce a force on the seat having upward and forward components. The rocket engine 4 and catapult casing 5 are illustrated as single tubes for convenience of illustration, but usually comprise plural tubes.

The improved ejecting system comprises, in general, a gas generator 12 containing a material 13 which produces gas at a rapid rate when burned, a flow control device 14, constituting the subject matter of the present invention, a locking device 15 for locking the rocket engine 4 in the catapult casing 5, and passages interconnecting the parts to utilize the gas from the generator to operate the flow control device, the locking device and propel the rocket engine, see FIGURE 3. The ejecting system further includes an ignition system 16 operable responsive to pressure and including a closure 17 for nozzle 9, and a cooperating stripper 18 operated by the movement of the rocket engine for stripping the closure 17 from the rocket engine nozzle 9 to control the ignition of the propellant 19 in the rocket engine 4. The locking device 15 and ignition system are claimed in separate application for patent filed concurrently herewith, Serial No. 187,881, filed April 16, 1962.

The gas generator 12 comprises a relatively small chamber, see FIGURES 2–A to 2–D, filled with the gas-producing material 13 which may be the same material as the solid rocket propellant material 19 used in the rocket engine 4, see FIGURE 3. The gas-producing material 13 may be ignited in any suitable way, such as by electrical ignition of a squib, and controlled by a button 20 on the side of the pilot's seat, see FIGURE 1, or by any other suitable device under the manual control of the pilot. The gas so generated flows from the chamber 12 through the passage to operate the flow control device 14 when required, and the locking device 15 to release the rocket engine 4 and to the bore 24 in the catapult casing. The gas supplied to the catapult casing 5 acts on the rearward end of the rocket engine 4 and closure 17, which together constitute a piston, for initially propelling the engine relative to the casing from the position illustrated in FIGURE 2–A to that illustrated in FIGURE 2–B. As the rocket engine 4 moves relative to the catapult casing 5 and frame 8 of the aircraft, it also carries with it the pilot's seat 2. The movement of the rocket engine 4 continues relative to the catapult casing 5 until the stripping device 18 operates to withdraw the closure 17 from the nozzle 9 of the rocket engine 4, as illustrated in FIGURE 2–C. The high-pressure gases for propelling the rocket engine 4 then enter the rocket engine through the open nozzle 9 and produce a pressure pulse therein. Igniter 16, operable in response to pressure, then ignites the rocket propellant 19 at the precise time required to propel the rocket engine 4 as its nozzle leaves the catapult casing 5.

As shown more in detail in FIGURES 3 to 6 of the drawings, the various elements of the catapult for controlling the rocket engine 4 are assembled in a single unit in the casing 5. Casing 5 has a cylindrical bore 24 in which the rocket engine 4 is mounted, a cylindrical bore 25 in a boss 26 and extending at right angles to the bore 24 for mounting the locking mechanism 13, and a cylindrical bore 27 in the boss 26 extending parallel to the cylindrical bore 24 for mounting the gas generator chamber 12. The gas generating chamber 12 has a reduced threaded nipple 28 at one end which is screwed into the boss 26 and the nipple and boss have cooperating offset annular shoulders with annular seals 29 and 30 between the parts. Similarly, the bore 24 has a seal 22 for co-operation with the periphery of the rocket motor 4.

The boss 26 of the catapult casing 5 is cored to provide an annular chamber 42 around the locking device 15 and ports 43 and 44 extending from the chamber to the cylindrical bore 24 in the casing. Thus, gases from the generating chamber 12 flow through the flow control device 14 into the annular chamber 42 and then through the ports 43 and 44 into the bore 24 of the catapult casing to act on the rearward end of the rocket engine to propel it outwardly from the casing.

The locking device 15 is in the form of a nut having a hexagonal head 45 and a hollow shank 46 with a screw-threaded end 47 which is screwed into corresponding screw threads in bore 25 to mount the locking device in the boss 26 of the catapult casing 5. The locking device 15 is in the form of a bolt 48 projecting into a keeper groove 49 in the side of the rocket engine 4 to positively lock the engine 4 in the catapult casing 5. Bolt 48 projects from the circular end of a hollow piston 50 having an annular skirt 51 closely fitting the interior of the shank 46. Piston 50 and bolt 48 are held in the shank 46 so that the bolt 48 will project into the keeper 49 by means of a second piston 54 in the shank which overlies the lower piston 50 and has a series of tangs 55 extending between the pistons and the tangs are provided with enlarged laterally projecting ends 56 projecting into a correspondingly shaped annular groove 57 in the interior of the skirt of the hollow piston 50. Depending from the piston 54 is a stem 58 having a flange 59 overlying the enlarged ends of the tangs 55 and normally preventing them from collapsing inwardly, but providing an annular recess 60 into which the ends of the tangs may collapse inwardly when the piston 54 moves downwardly with respect to the piston 50. The tangs 55 depend from an annular ring 61 surrounding a reduced portion of the piston 54 and the ring is connected to the piston 54 by a series of shear pins 62. At least one of the shear pins extends through the ring into the wall of the hollow shank 46. Pistons 50 and 54 are sealed to the inner wall of the shank 46 by O-ring seals 63 and 64. The annular wall of the hollow shank 46 also has a series of ports 53 extending upwardly at an angle from the annular chamber 42 to the space at the top of piston 54 and the end of piston 50 is subjected to the pressure of the gas flowing through the ports 43 and 44 into the cylindrical bore 24. As will be observed in FIGURE 3, the wall of the hollow shank 46 is stepped so that the piston 50 has a slightly larger area than the piston 54.

A stripper 18 of any suitable construction is mounted on the rearward wall 65 of the catapult casing 5. In the illustrated embodiment the stripper 18 comprises a rod having its rearward end extending through and attached to the rearward wall 65. The strip rod 18 extends forwardly from the wall 65 through a hole 66 in the closure 17 for the nozzle 9 and into the rocket engine 4 and, more specifically, into the annular opening 67 in the propellant material 17. The inner end of the strip rod 18 is provided with an enlarged head 68, as shown in FIGURES 3 and 4.

The igniter 16 comprises a cylinder sleeve 69 mounted fast to the attached end of the rocket engine at the axis of a recess 70 and has ports 71 opening into the recess. Mounted to slide in the cylinder sleeve 69 is a piston 72 having a firing pin 73 at its inner side which operates in the manner of a hammer in fire arms. Adjacent to the firing pin 73 is a percussion cap 74 in intimate contact with a primer material 75 which, in turn, has access to flammable powder 76. The flammable powder 76 is contained in a perforate cylinder 77 through which the flame escapes to ignite the propellant material 17 for the rocket engine. The piston 72 of the igniter 16 is restrained by a pin 78 which is sheared by high-pressure gas to operate piston 72 to ignite the propellant material 17.

In accordance with the present invention, a flow control device 14 is provided which operates in steps to maintain a desired burning rate in the gas generator 12 until a predetermined pressure is exceeded, and then decreases the pressure and burning rate in the gas generator. Control device 14 operates automatically to maintain a high pressure, below certain limits, for a longer period of time.

Figure 4:
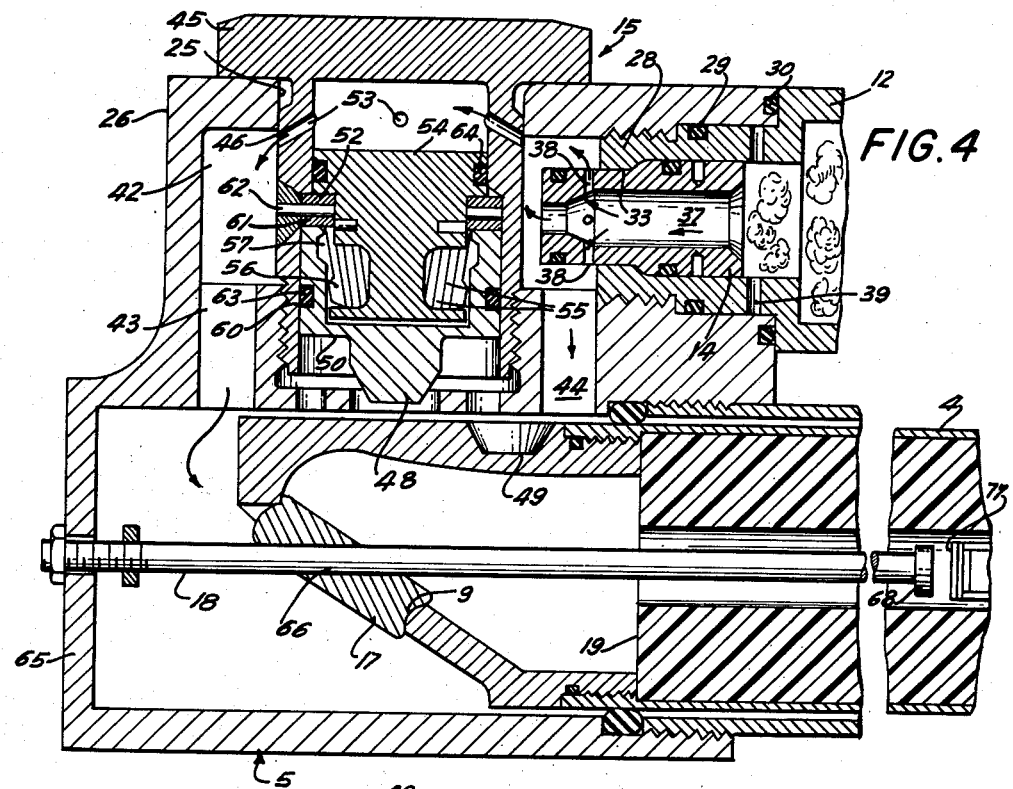
FIGURE 4 is a sectional view of the rearward end of the catapult casing, similar to FIGURE 3, and showing the flow control device actuated to maintain the pressure and rate of burning in the gas generator within desired limits.
Figure 5:
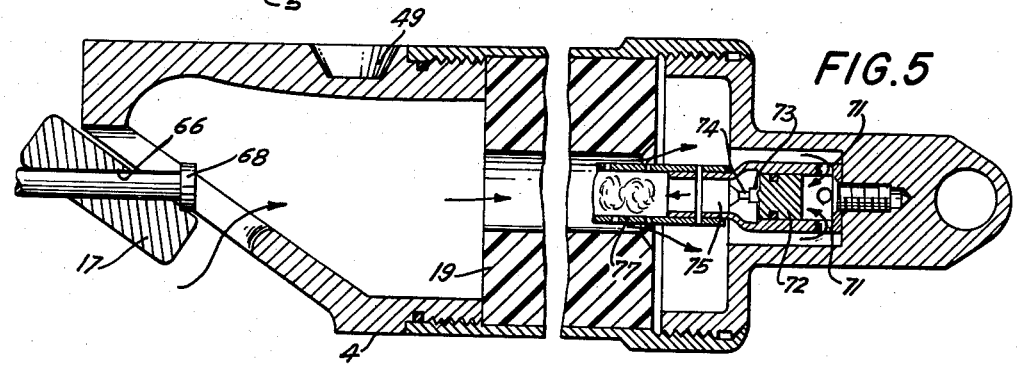
FIGURE 5 is a view of the rearward end of the rocket engine as it is being propelled and showing the nozzle closure being stripped from the rocket engine.

In the illustrated embodiment shown in FIGURES 3 and 4 of the drawings, the flow control device 14 is in the form of a spool valve mounted to slide in the nipple 28 of the gas generating chamber 12. In the following description the reference character 14 will be used interchangeably to indicate the flow control device generally and the spool valve specifically. The interior of nipple 28 is counterbored to form an inwardly projecting annular rim 33 to closely fit the outlet end of spool valve 14 and an enlarged bore to closely fit the enlarged hub 34 of the spool valve. Spool valve 14 has a primary orifice 37 extending coaxiallly therethrough and a plurality of secondary orifices 38 extending radially from the primary orifice. The spool valve 14 also is provided with a peripheral shoulder disposed near its supply-port end. O-rings 35 and 36 provide a slideable fluid-tight seal between the spool valve 14 and interior of nipple 28. Shear pins 39 of a number and size to shear at a gas generator pressure yielding the most satisfactory system performance restrain spool valve 14 with respect to nipple 28. The primary orifice 37 of the flow control device discharges into the annular chamber 42 for operating the locking device 15 and ignition system as previously described.

Referring to FIGURE 4, the spool valve 14 is shown displaced downstream to a second, or compensating, position as a result of an excessive supply pressure having acted on the supply end of spool valve and causing shear pins 39 to shear. Secondary orifices 38 are then positioned to open into the annular chamber 42 and provide for mass flow compensation to limit the pressure and burning rate in gas generating chamber 12.

Referring again to FIGURE 3, the controller 14 operates in a non-compensating manner when propellant 13 is ignited and delivers gases to supply orifice 37 at a pressure level less than a predetermined threshold. However, due to the properties of shear pins 39, spool valve 14 is retained in the position shown in FIGURE 3. Thus, in this position the entire mass flow is conducted from gas generator 12 through primary orifice 37 and outwardly to annular chamber 42. Flow compensation is prevented by the position of the secondary orifices 38 to a closed space between the cooperating stepped shoulders 33 and 34 on the nipple 28 and spool valve 14 and sealed from all other passages by O-rings 35 and 36.

Referring to FIGURE 4, when pressures exceeding a predetermined level are produced in gas generator 12, which excess is usually caused by a marked increase in the burning rate of propellant 13, pins 39 restraining the spool valve 14 are sheared. Spool valve 14 then moves downstream to a position where the shoulders between enlargements 33 and 34 abut, thus prescribing a flow compensating position. In this position, secondary orifices 38 are uncovered and permit gas to flow into the chamber 42. Thus, mass flow compensation is provided through supplementary pressure relief of gas generator 12. A decrease in propellant burning rate accompanies this pressure relief which causes a downward adjustment in mass flow of generated gases. The main flow of gases still passes through primary orifices 37 which, in addition to the secondary flow, provides for a more satisfactory and reliable catapult performance.

As mentioned before, ambient temperature of propellant 13 has a substantial effect in producing variations in catapult performance. Decreases in these variations by as much as 45% may be realized by substituting the two-stage orifices of the present invention in place of a single fixed sonic flow orifice in the gas stream supplying the catapult. This is illustrated by referring to the graphical illustrations of FIGURE 7. While these figures show A and B plots of chamber pressure versus burning time, the area under the curves, combined with orifice data, substantially represents mass flow of propellant combustion products. These curves are actual test data of comparative testing between a rocket catapult system having a catapulting time history of about one-quarter second and a fixed sonic flow orifice of 0.182 inch diameter (curve A), compared to one (curve B) having a two-stage sonic flow orifice using a primary orifice of 0.182 inch and four secondary orifices, each of 0.50 inch diameter. It can be seen from FIGURE 7 that the gas generator propellant at 200° F. ambient temperature produced pressures of combustion in excess of 10,000 p.s.i. when using a single fixed orifice, while a two-stage orifice system compensated the flow to a level where it limited peak pressure to a value less than 6,000 p.s.i. It will also be noted that curves A and B cross each other so that the stepped orifice arrangement produces a lower pressure for a longer period of time.

Figure 7:
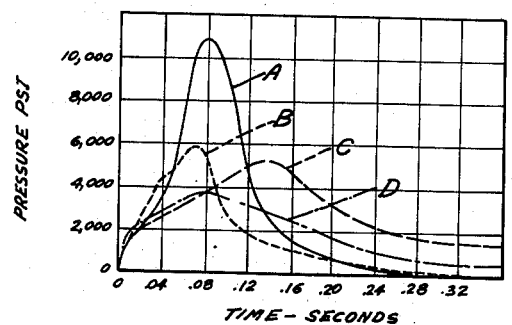
FIGURE 7 is a chart showing the more uniform pressure over a longer period of time produced by the flow control device between the gas generator and rocket engine.

Referring again to curves C and D in FIGURE 7 wherein the propellant was conditioned at an ambient temperature of −65° F., peak pressures in excess of 5,000 p.s.i. were produced using a fixed orifice, while the two-stage orifice limited peak pressures in the gas generator to a value of about 3,500 p.s.i. A slight difference in curvature in the early time history is accountable because of slight differences in orifice coefficients. It will be understood that a proper spool valve 14 for particular operating conditions may be easily and quickly provided by merely substituting gas generators having the required spool valve therein.

Thus, problems attendant with temperature and pressure effects on burning rate sensitivity of solid propellant gas generators are markedly reduced by utilizing flow compensation embodiments of the present invention. Performance variations in rocket catapult systems are minimized over a prescribed temperature range in addition to providing reproducible performance at any given environmental temperature. Additional advantages are derived from the simplicity of design and inherent high reliability. Also, weight savings are obtained by utilizing thinner materials due to reduced peak operating pressures. While the aforementioned disclosure refers to a two-stage fluid flow controller, multiple-stage orifices also may be used, including those operating in cascade. This is particularly true when the necessity arises in systems requiring a longer action time, or those with more precise operating pressures, or combinations of these. One form of the invention having now been described in detail the mode of operation is now explained.

When the pilot wishes to be ejected, he presses the button 20 at the side of his seat, which closes an electric circuit to ignite the material in the gas generating chamber 12. Gas from the gas generator 12, see FIGURE 3, flows through the flow control device 14 and into the annular chamber 42 surrounding the locking device 15. The gas then flows from the chamber 42 through the ports 43 and 44 to the cylindrical bore 24 in the catapult casing to act on the rocket engine 4 and piston 50 of the locking device. Simultaneously gas flows through the ports 53 into the chamber 54 overlying the piston 54 of the locking device 15.

The gas leaving the gas generator 12 flows through the central orifice 37 of the spool valve 14 which controls the mass flow rate and maintains a pressure in the gas generator to insure burning of the propellant 13. If the pressure in the gas generator 12 exceeds a value for most efficient operation, the pins 39 shear to release spool valve 14 which then moves from the position illustrated in FIGURE 3 to that illustrated in FIGURE 4. Gas then flows through orifices 38 as well as through 37 to reduce the pressure and burning rate in the gas generator. Thus, spool valve 14 controls the mass flow rate from gas generator 12 to the catapult casing 5 to produce the desired pressure.

The pressure of the gases acting on the piston 54 of locking device shears the pins 62 to cause the piston 54 to move downward relative to ring 61 and piston 50 until the flange 59 is positioned below the tangs 55, as illustrated in FIGURE 4. Immediately upon release of the tangs 55, the shoulder 52 on the piston 54 engages the ring 61 and shears the shear pin 62 extending into the wall of the shank 46. This downward force of the piston 54 relative to the piston 50 causes the enlarged ends of the tangs 55 to be cammed inwardly into the annular space 60 in the piston 54 which releases the piston 50. The pressure acting on the larger surface of the piston 50 then moves the latter, together with the piston 54, from the position illustrated in FIGURE 3 to that illustrated in FIGURE 4. Such upward movement of the piston 50 withdraws the locking bolt 48 from the keeper groove 49 in the rocket engine.

As soon as the locking bolt 48 has been withdrawn, the high-pressure gases from the gas generator 12 act on the rearward end of the rocket engine 4 and closure 17 for the nozzle 9, which together act as a piston, to propel the rocket engine from the catapult casing 5. The forward movement of the rocket engine 4 from catapult casing 5 causes the rod 18 to strip the closure 17 from nozzle 9 to permit the high-pressure gases to enter the rocket engine through the nozzle. The pressure of the gases then actuates the hammer-like piston 72 having the firing pin 73. Firing pin 73 explodes the percussion cap 74 which, in turn, ignites the primer material 75 and flammable powder 76. Powder 76 burns and projects its flame through the perforation in cylinder 77 to ignite the propellant 19 for the rocket engine. Thus, the propellant material 19 is ignited just prior to the ejection of the nozzle end of the rocket engine from the catapult. Thus, the rocket engine 4 is self-propelled immediately upon leaving the catapult casing 5 and ejects the pilot and his seat 2 forwardly and upwardly so that it will clear the aircraft 1 before it starts to descend.

It will now be observed that the present invention provides a fluid flow control device which reduces variations in the generation of gas in a gas generator. It also will be observed that the present invention provides a flow control device which is responsive to a predetermined pressure in the gas generator to reduce the pressure and rate of gas generation to maintain a more uniform pressure pattern. It will further be observed that the present invention provides a fluid flow control device for a catapult-launched rocket-engine which is operable in steps to maintain a maximum pressure and burning rate in a gas generator until a predetermined pressure is reached and then partially reducing the pressure and burning rate when the pressure is exceeded. It will still further be observed that the present invention provides a flow control device which is of simple and compact construction, economical to manufacture and one which is reliable in operation.

While a single embodiment of the invention is herein illustrated and described, it will be understood that changes may be made in the construction and arrangement of elements without departing from the spirit or scope of the invention. Therefore, without limitation in this respect, the invention is defined by the following claims.

We claim:

1. In an apparatus of the type in which high-pressure gas is produced at a rate functionally related to pressure by burning a gas-producing material in a generating chamber and in which the gas is utilized to operate a device, the combination with said apparatus of a conduit between the gas generating chamber and device, and flow control mechanism in said conduit to regulate the rate of generation of gas in said chamber and the pressure of said gas supplied to said device comprising a piston mounted to slide in said conduit and having a plurality of outlet ports therein, structure in said conduit cooperating with said piston to initially close all except a single port through which the generated gas flows from the generating chamber to the device, and means for holding said piston in its initial position and operable at a predetermined pressure to release said piston for movement by said gas to uncover at least one additional outlet port whereby to maintain more uniform burning rate of the gas producing material and a more uniform pressure of the gas delivered from the generating chamber.

2. Apparatus in accordance with claim 1 in which the device is an ejecting apparatus for ejecting an object from an aircraft comprising a catapult and means utilizing the high-pressure gas generated in the chamber to operate the catapult.

3. Apparatus in accordance with claim 1 in which the device is an ejecting apparatus for ejecting an object from an aircraft and comprising a lock for locking the object to the airplane, and means operated by the high-pressure gas to actuate the lock to a releasing position.

4. Apparatus in accordance with claim 1 in which the conduit has an enlarged chamber at one end, said ported piston is a spool valve having an axial port and a radial port, said spool valve being positioned in said conduit by said holding means to connect the axial port to the chamber and close the radial port in the initial position, said spool valve moving to position the radial port in the chamber when the predetermined pressure is exceeded, and means for limiting the movement of said spool valve when released.

5. Apparatus in accordance with claim 1 in which the holding means is one or more shear pins extending between said piston and conduit and of a cross-sectional dimension to shear when the predetermined pressure is exceeded.

6. Apparatus in accordance with claim 1 in which the conduit has stepped diameters and an enlarged chamber at one end, the ported piston is a spool valve having steps corresponding to the steps in the conduit wall, ring seals between the piston and conduit at each step, said piston having an axial port and a radial port positioned in said conduit to close the latter, the holding means comprising a shear pin extending between the piston and conduit and having a cross-sectional dimension to shear when the predetermined pressure is exceeded, said spool valve moving to position the radial port in the chamber when the pin is sheared, and the annular shoulder between said steps of the piston engaging the annular shoulder between the steps of the conduit wall to limit the movement of said spool valve when released.

References Cited in the file of this patent

UNITED STATES PATENTS

| | | |
|---|---|---|
| 2,937,830 | Fulton | May 24, 1960 |
| 3,065,597 | Adamson | Nov. 27, 1963 |
| 3,077,077 | Jones | Feb. 12, 1963 |